United States Patent [19]
Molyneux

[11] 3,820,012
[45] June 25, 1974

[54] DETERMINATION OF THE ORIENTATION OF MAGNETISM IN A SAMPLE OF MATERIAL

[76] Inventor: Lindsay Molyneux, 4 Leazes Cres., Newcastle upon Tyne, England

[22] Filed: Apr. 13, 1972

[21] Appl. No.: 243,604

[30] Foreign Application Priority Data
Apr. 17, 1971 Great Britain...... 9719/71
Apr. 17, 1971 Great Britain...... 9720/71

[52] U.S. Cl. .................................. 324/14
[51] Int. Cl. ... G01v 3/08, G01r 33/12, G01n 27/00
[58] Field of Search................ 324/13, 14

[56] References Cited
UNITED STATES PATENTS
2,634,317  4/1953  Marchand et al........ 324/14
2,665,332  1/1954  Weiss et al............. 324/14
3,058,054  10/1962  Henderson............. 324/14

Primary Examiner—Gerard R. Strecker
Attorney, Agent, or Firm—Steinberg & Blake

[57] ABSTRACT

A magnetic orientation estimator has flux sensitive magnetic pick-up heads carried around a sample locator. The locator preferably has a cube shaped rock sample holder, carried on a rotor which also carries a revolution detection means for indicating when a complete revolution of the sample is achieved and a series of position detection means for indicating predetermined angular increments of each of the samples. An analogue to digital converter is electrically connected to the pick-up heads for use with a computer. The computer is programmed to receive and store the digital information from the analogue to digital converter in a series of locations in a memory bank each corresponding to one of the predetermined angular positions. For each revolution the digital information for each angular position is added to the previously stored information in that memory location. The position detection means may comprise a series of slots in a disc carried on the rotor in cooperation with a photoelectric sensor. The revolution detection means may comprise a single slot on the same disc radially spaced from the series of slots and cooperating with a further photoelectric sensor. The computer is preferably programmed to analyze the wave form represented by the digital information and to store the results of the analysis in a further memory location. This procedure can be repeated for various positions of the sample and the results of each procedure can be combined to produce the final results.

9 Claims, 7 Drawing Figures

DETERMINATION OF THE ORIENTATION OF MAGNETISM IN A SAMPLE OF MATERIAL

This invention relates to the determination of the orientation of magnetization in a sample of material such as rock.

The study of the magnetization of rock samples is an important branch of Geophysics, e.g., for estimating the location of the rock or of the North Pole in the ancient past. Many systems of measuring the weak remnant magnetism of rock samples have been proposed but all of them involve further calculation in order to specify the magnetic vector of the sample, which may be in the order of $10^{-6}$ gauss. None of them are readily employed which is an important consideration since many specimens need to be evaluated in order to provide a result with meaning.

An object of the invention is to provide means for determining the direction, in three dimensions, of the remnant magnetism within a sample of rock.

According to the invention a magnetic orientation estimator comprises a flux sensitive magnetic pickup head, a rotor for rotating a sample of material near to the head, an analogue to digital converter connected to the head for converting the output of the head into digital form for feeding the input register of a computer, revolution detection means associated with the rotor for informing the computer when a complete revolution of the sample is achieved and a series of position detection means also associated with the rotor for indicating predetermined angular increments of each revolution of the sample.

According to another aspect of the invention the computer is programmed to receive, and store in a series of locations in a memory bank, digital information and periodically to add further digital information to the previously stored information and to store the sum in the same locations. Subsequently, the computer mathmatically analyzes the wave form represented by the digital data stored in the locations and further stores components characterizing the wave form in other locations of the memory bank. The first mentioned series of locations is cleared and the entire process is repeated with the components characterizing the new wave form being stored in still further locations in the memory bank. After the process is repeated a predetermined number of times, all the stored components are combined to obtain resulting components characterized by each of the stored components.

The rotor is preferably provided with a locator for locating the sample of material in relation to the pick up head, and a holder is preferably provided for holding the sample in alternative locations on the locator thereby permitting repetition of the rotation with the sample held in various orientations.

According to a further aspect of the invention the holder comprises a cube with a cavity opening from a top face, and includes resilient members extending from each of the sides of the opening to an adjacent side of the cavity remote from the opening.

The cavity may be cylindrical and the resilient members, which may be of synthetic fibre such as nylon, may extend accordingly from the end of one diameter at the opening to the end of a perpendicular diameter in a plane remote from the opening.

The locator preferably comprises a square recess for receiving one of the faces of the holder and is preferably spaced from a drive motor, e.g., an electric motor, and from any metal parts, e.g., the position detection means, thereby avoiding any undue effects on the pick up head. The locator can be located at the end of an elongated rotor and the holder, locator and rotor can be constructed of, for example wood or synthetic plastics material.

The holder is preferably apertured at its base end remote from the top opening to allow passage of the resilient members, of which four may be provided symmetrically spaced around the cavity.

The base end of the cube is preferably grooved to receive the resilient members and the grooves may be continued up the sides of the holder and into the top opening.

The cube may be in skeletal form, such that its structure extends around the top opening and around the base and includes a pillar or pillars between these parts. The holder may be formed without perpendicular corners, i.e., the pillar or pillars extend from a side of the base to a corresponding side of the top.

The analogue to digital converter may be adapted to feed successive digital words sequentially to the series of locations in the memory bank of the computer upon successive actuation of the position detection means, which may comprise a lamp and photo electric cell and a series of slots spaced around a disc. The revolution detection means, may comprise a lamp and photoelectric cell and a single slot in the disc spaced from the series of slots. The revolution detection means can cause the computer to commence the sequential adding of the digital words to those already stored in the series of locations in the memory bank.

The rock samples used in paleomagnetism can have many shapes but are typically rock cylinders 1 inch in diameter and 1 inch high. These samples are prepared from larger pieces of rock collected in various parts of the world and are marked so that the axis and fidutial line on the cylindrical samples can be related to the positions that they occupied when collected.

The problem however is to measure the direction, in three dimensions of the magnetism within the rock sample.

The invention will be further described by way of example with reference to the accompanying drawings in which.

Figure 1:
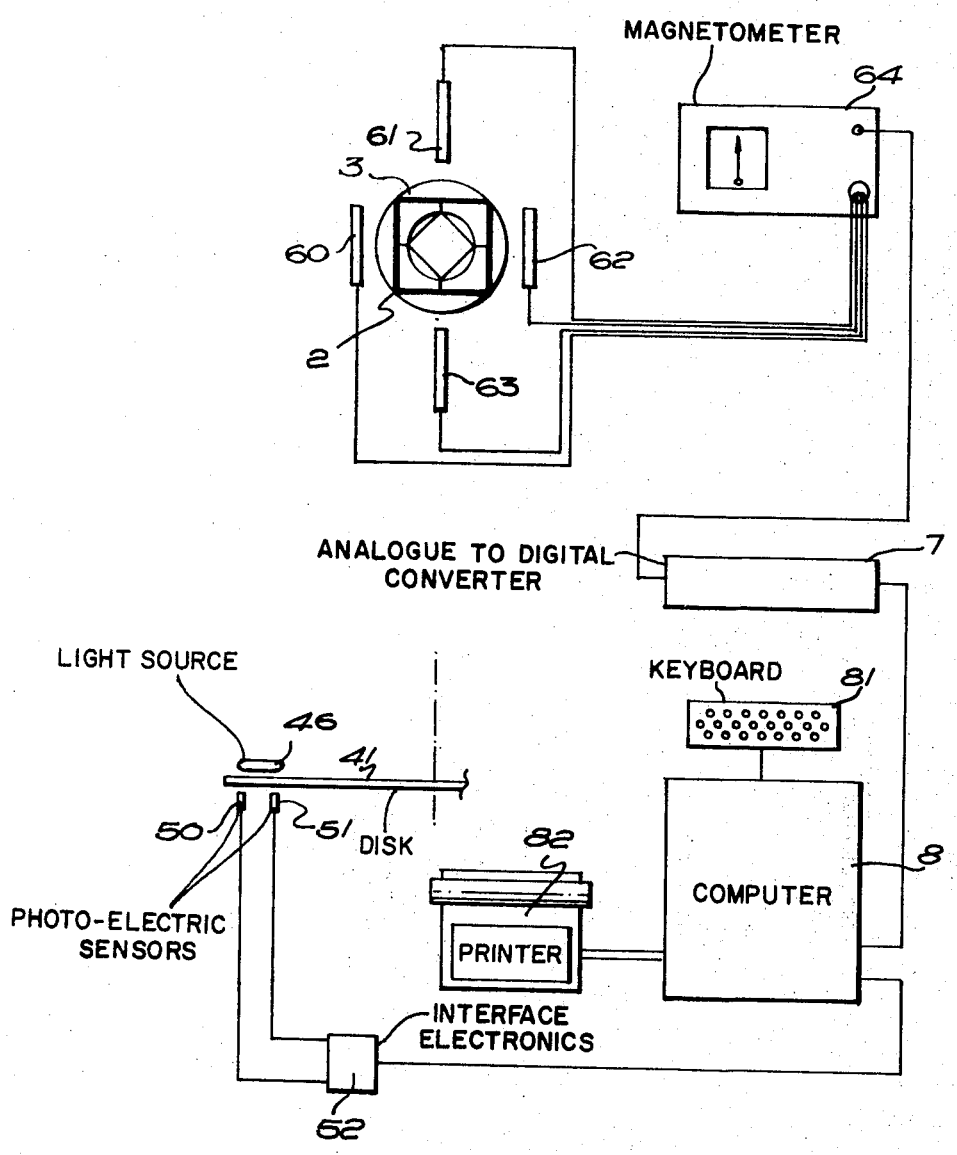
FIG. 1 shows the system layout and interconnections of a magnetic orientation estimator according to the invention when in use.
Figure 2:
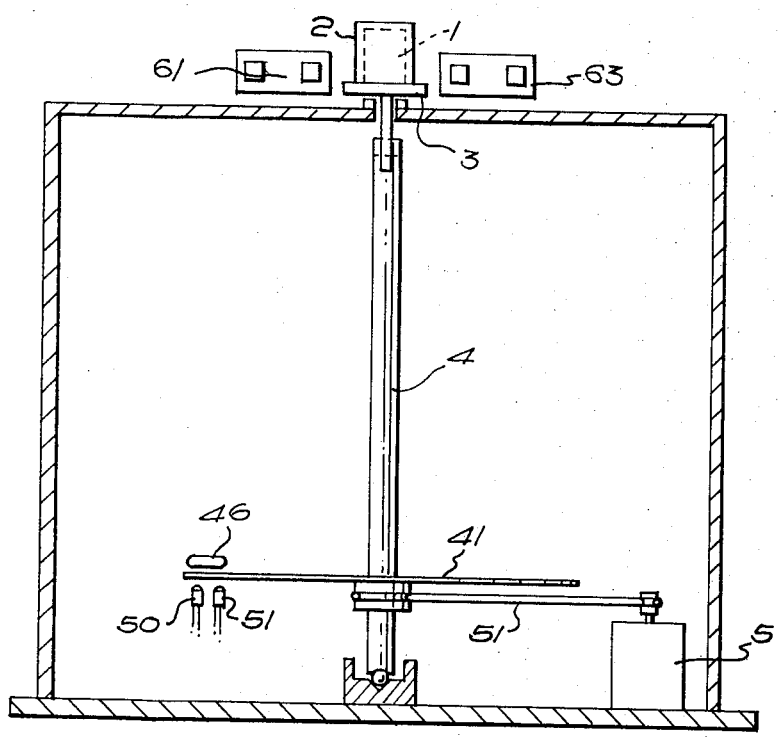
FIG. 2 is a side elevation of the pick up head, rotor and the detection means assembly of the magnetic orientation estimator of FIG. 1.
Figure 3:
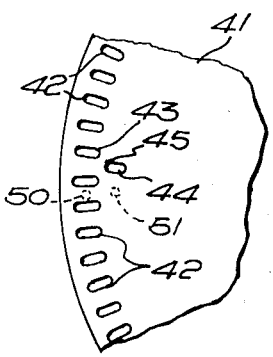
FIG. 3 is a detail view of part of the detection means of FIGS. 1 and 2.
Figure 4:
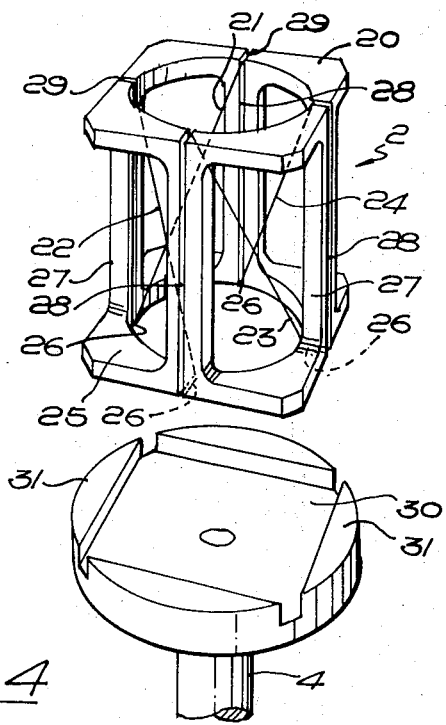
FIG. 4 shows a sample holder and locator of the magnetic orientation estimator of FIGS. 1 and 2, and FIGS. 5, 6, and 7 are flow chart diagrams showing the steps of a program for use with the estimator of this invention.

For making a measurement of the magnetic orientation of a rock sample for example 1 inch long with a diameter of 1 inch, the sample is inserted in a holder 2 through an opening in the top 20 into a cylindrical cavity centrally of the holder 2 and is held by resilient members 21, 22, 23, 24 made of a nylon filament. Each resilient member extends from the end of a diameter at the opening in the top 20 to the end of a perpendicular diameter at the opening in the base 25. The base is formed with grooves 26 at each side to allow passage there through of the resilient members 21, 22, 23, 24. Pillars 27 connect the top 20 and base 25 at each side and are each formed with inner and outer grooves 28 continuing from the grooves 26 in the base and running into grooves 29 in the top 20. The nylon filament is wound around each pillar 27 through the openings in the top 20 and base 25 and in the grooves 26, 28, 29.

The holder 2 is placed on a locator 3 typically being a wooden platform 30 with raised wooden sides 31 forming a square recess retaining the holder 2. This platform 30 is on the end of a vertical rotor shaft 4 typically of plastics material about 40 inches long. The shaft 4 is rotated at about 7 revolutions per second by means of an electric motor 5 and an elastic driving band 51. The motor 5 is at the bottom of the shaft 4 and therefore is at a distance from the rock sample 1.

The shaft 4 also has attached to it at the lower end a disk 41 which has 128 slots 42 each ½ inch long and cut on a radius from the center. The disk 41 has also a single slot 44, also on a radius, and ½ inch long, which is situated so that its most outside edge 45 is ¼ inch from the inner edge 43 of the series of 128 slots. Both the 128 outside slots 42 and the single slot 44 are illuminated by an electric bulb 46 which is situated about ½ inch from the upper side of the disk 41. Beneath the disk 41 there are two photo-electric cells 50, 51. Cell 50, that can be illuminated through the ring of 128 slots 42 and, the other cell 51, can be illuminated through the single slot 44. Thus, one photo cell 50, called the position detection cell, is illuminated 128 times per revolution while the other photocell 51, called the revolution detection cell, is illuminated once per revolution. Both cells 50, 51 are connected to an interface electronics device 52 connected to a computer 8 for enabling computer orders to determine when the cells are illuminated.

Around the rock sample 1 are positioned four magnetic pick-up heads 60, 61, 62, 63 of the fluxgate type. These heads are sensitive to magnetic fields and are arranged so that they respond to the rock sample 1 rather than external fields. The output of the heads is converted into a voltage component proportional the field of the rock sample in a predetermined direction by a device 64 well known to the art, to which the heads 60, 61, 62, 63, are connected.

Though the fluxgate field detection system is a practical method of measuring the field from the rock sample 1, many other types could be used, for example, hall probes; and the detector systems that depend on the properties of matter at liquid helium temperatures.

In any event the detection system, at the output of 64, will produce a voltage proportional to the field from the rock in the horizontal plane and resolved along a particular direction. The voltage is then fed into an analogue to digital converter 7, which changes the voltage into a word of binary digits or "bits." The digital word emitted is 12 bits long though other lengths would be satisfactory. The bits from the converter 7 are presented to the computer 8 on a command from the computer.

A typical measurement will now be described.

The 1 inch cylindrical rock sample 1 is placed in the holder 2 and the holder 2 then located on the platform 30 on the top of the shaft 4. The shaft 4 is then set in rotation by turning on the driving motor 5. As the rock 1 turns the voltage from the device 64 that is attached to the pick up heads shows a sine curve, albeit mixed with noise and harmonics. The sine curve and noise is fed into the converter 7.

It is now necessary to outline the action of the computer program. When the program is started it performs initial actions such as setting to zero certain areas of memory and setting the size of the rock 1 in accordance with instructions fed in from a keyboard 81 attached to the computer.

The computer 8 then obeys the instruction from device 52 to advance one step when the position detection cell 50 is lit. However since this instruction is followed by a jump back by one step, the program stays in a loop till the revolution marker slot 44 is encountered. It should be stated here that the marker slot 44 is positioned midway between two position slots 42. Once the marker slot 44 has been encountered the program then "waits" with a similar loop comprising a skip on position detection order followed by a jump backward until the measurements are started. When the position slot 42 is encountered the computer issues a command to the converter 7 which reads in the instantaneous value of the wave form from the magnetic field detection system. This value is added to a location in the computer memory (previously set to zero by the initial sequence). The computer then waits till the next position slot 42 permits illumination of the position cell 50 before issuing a new command to the converter 7 and then add the result to the next second location. The process continues for 128 positions each occupying a separate location (actually 2 words of 16 bits for each location) in the computer memory. After the one hundred and twenty-eighth slot has been detected a check is made that the revolution marker slot 44 is in the correct place — and the cyclical process continues, until a predetermined number of cycles have been collected.

At this point the computer has stored a sine wave (mixed with noise) defined by 128 points — and it should be remembered that the stored sine wave is the mean of the number of rotations that were collected.

The 128 points are then analyzed by Fourier analysis to give the magnitude and phase of the best fitting sine wave to the stored result. The magnitude of the fitted sine wave is then the magnitude of the magnetic vector in the plane of the magnetic heads and the phase angle is the angle of the magnetic vector to the fiducial line.

The results are then printed out by a printer 82 in the form of a "North" component and "East" component as well as the same information expressed in the form of a magnitude and angle. The components are also stored within the computer memory.

The rock sample 1 is then repositioned about a new axis by simply lifting and rotating the rock holder 2 containing the rock sample 1 and repositioning it on the platform. The procedure is now repeated, and when the required number of revolutions has been completed the results are again printed out and stored. During the storage process the components are assigned to storage locations. When the sixth axis has been measured, the complete result for the rock sample can be obtained in the form of three orthoganal components which are independent of any characteristics of the rotating platform 3 and shaft 4 since components from these are cancelled out by the use of a correction procedure.

After the sixth axis has been measured these components are printed out in units of $10^{-6}$ gauss and the same information is also printed in the form of total intensity, declination, and Dip, these being relative to the upper surface and fiducial line on the rock sample.

The computer can be a general purpose computer having at least 4,096 words of memory and capable of being interfaced with a teletypewriter, a paper tape punch and reader, a magnetometer output and interface electronics connecting photocell outputs.

Figure 5:
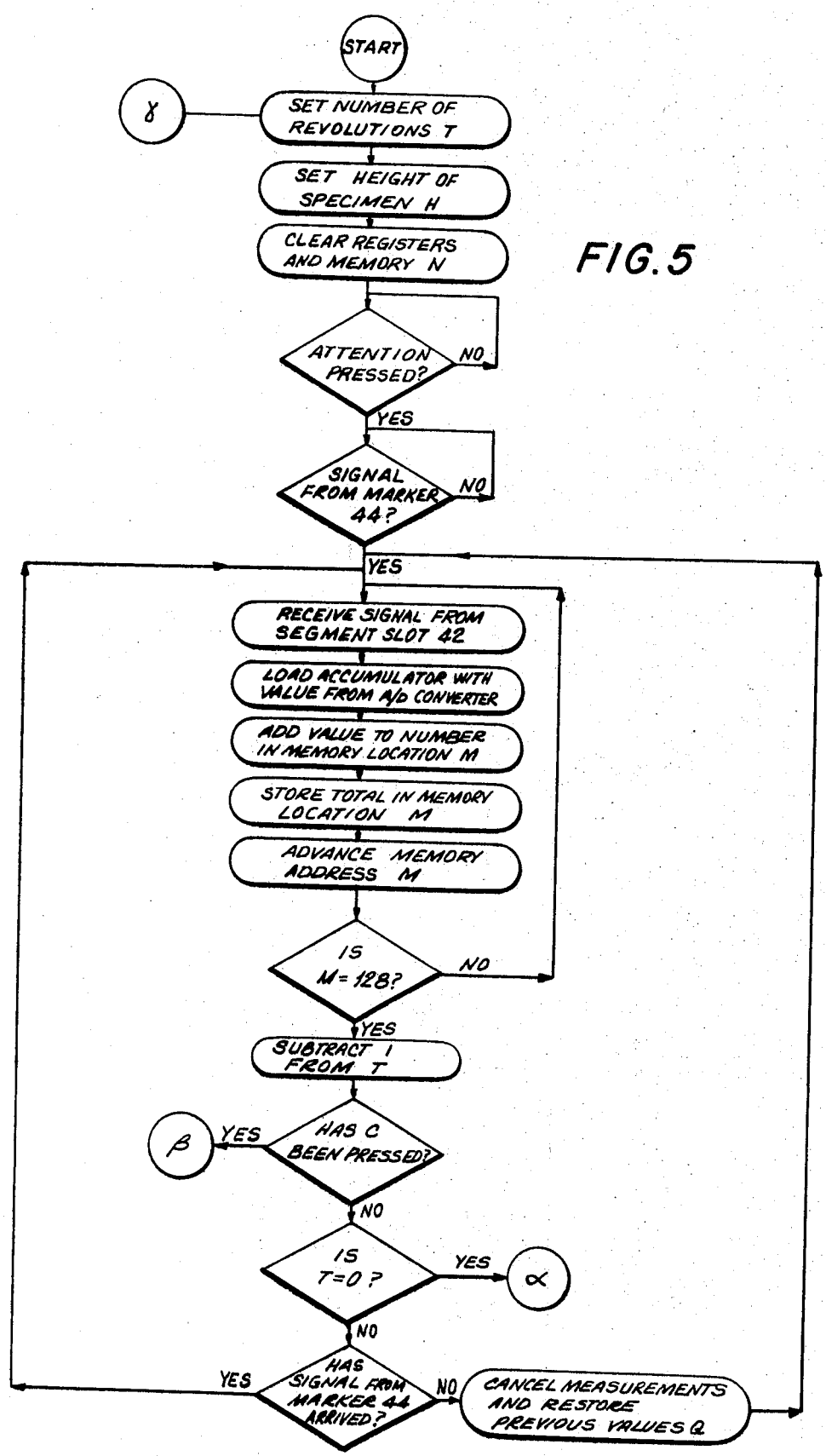
Figure 6:
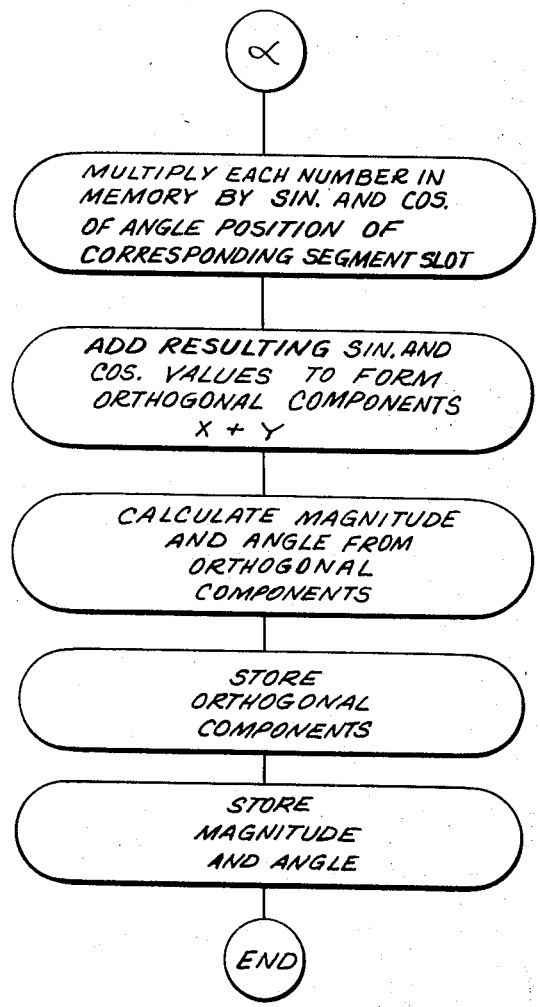
Figure 7:
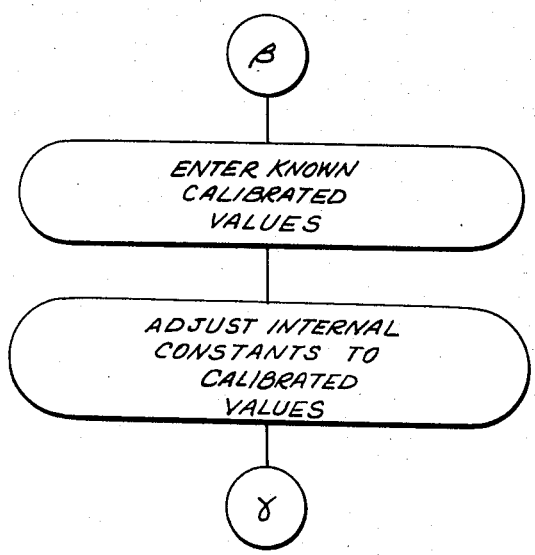

Referring now to FIGS. 5–7, there is shown as flow chart representing a typical computer program for carrying out the foregoing described measurements with the system of this invention.

The computer program is organized in the form of an Executive Program which allows the operator to call up the various routines of the process. The Executive Program is entered whenever a routine has been completed and it responds to commands from the keyboard.

The initiating control commands from the keyboard in order of normal operation, are: "T," "H" and "N."

When T is typed the program prints "SPINS = 2↑6/2 ↑" meaning that the number of revolutions is $2^6$, or 64, rotations. The operator may now type a number in the range 0 to 12 which will alter the number of spins from $2^0$ to $2^{12}$. The "attention" button is then pressed.

When H is pressed the program types $HT = 254$ / meaning that the height of the rock is assumed to be 2.54 centimeters or 1 inch. A new figure may be typed in if the sample is not this standard height. The "attention" button is then pressed. The height is later used in the calculation of intensity since this is given per unit volume. The diameter of the sample is assumed to be a fixed size.

When N is pressed it causes the text "ROCK NAME" to be printed and initiates the setting of the accumulator register to zero and clearing 256 consecutive locations of memory store. 256 locations are used since the 128 segment positions on the disc are each allocated two words of store because in the computer used a single word is only 16 bits long and would not store enough data. This technique of using two words for computing is known as "double length" working and is well known in the art of computer programming.

The Executive then waits in a loop until the separate button on the keyboard, called "attention" is pressed whereupon the measurement proceeds. The loop instruction includes an instruction to skip the next instruction if the "attention" button is pressed, the next instruction being a "jump back one" instruction, so that the program loops until "attention" is pressed. Other methods of causing a program to await an event before proceeding are well known in the art of processing and may be used. Until "attention" is pressed the keyboard may be used to type the identifying code for the sample. When this is done, and the specimen loaded for rotation to begin the "attention" button is pressed.

The "measure" routine then starts the program loops in a similar manner to that described above until the revolution marker slot 44 allows the photocell 51 to be illuminated. The program then waits using a similar program device until a position slot illuminates the photocell 50. When this happens, and at each subsequent interval corresponding to the remaining position slots, a signal is sent to the analogue to digital converter 7 which converts the output from the magnetometer 64 into a 12 bit number which is fed to the accumulator of the computer. The accumulator is the register which can communicate with all memory results of the computer. The computer then does a "double length" add with this number and the two words of memory store M allocated to this segment position and restores the sum back into the same memory locations. At the same position on further rotations the program will add the instantaneous reading from the analogue to digital converter to the total already stored. At the end of the add sequence the program advances the address of the memory location that the "double length" add will next work on, and then waits for the next of the 128 segment slots, and repeats until all of the segments have been dealt with. At this point the figure for the number of spins T is diminished by 1. If the result is not zero the procedure is repeated. If more or less than 128 positions have been registered when the 360° marker slot is sensed the measurement is cancelled by initializing the store. A letter "Q" is printed on the keyboard and the measurement cycle is repeated.

When the preset number of revolutions are completed the program enters a new routine indicated in FIG. 6. This routine takes the 128 numbers corresponding to the 128 positions and multiplies each number separately by the values of the sine and cosine of the angle between the corresponding angular position and the first segment, i.e., the first number is multiplied by sine 0° and by cosine 0°; the second number by sine 2.8125° and cosine 2.8125° (360° divided by 128) and so on.

The two results of each multiplication are sequentially added in two registers, so that at the end of the procedure they will contain numbers which, according to the Theory of Fourier, represent the orthogonally resolved components of the generating vector for the fundamental component of the wave form. These components, after multiplication by a figure that is sent by a calibration procedure, are in units of Gauss $\times 10^{-6}$. From the orthogonal components the magnitude and angle of the vector is calculated by known means. The references direction is the line from the axis of rotation through the first of the 128 angular position slots.

The orthogonal components represent the magnitudes of the magnetic field in the direction along orthogonal axes lying in the plane of rotation. The orthogonal axes are positioned so that the reference direction is parallel to one of the axes. Once the magnitude of the orthogonal components are known, using rectangular to polar transformation, the vector magnitude and angle can be determined.

The orthogonal components and the vector magnitude and angle in units of Gauss $\times 10^{-6}$ and degrees are printed out for each measurement and the orthogonal components stored in a separate part of the memory set apart for each orientation of spin. At this point the rotation is stopped and the specimen turned so that it will rotate about another axis and the process is again repeated. In this way readings are taken for the specimen holder lying on each of its six faces. The program causes a reference number in the range 1 to 6 to be printed before the list of values for each measurement.

At the end of the six measurements the six sets of stored values of orthogonal components are compared to obtain a total result for the sample. This process is well known in the art and is described in many treatises on geomagnetism. The results are calculated and printed out in the form of components in the X, Y, Z axes. The same information is then expressed as intensity, declination and inclination, again in a manner well known in the art.

The declination being the vector positioned with respect to two mutually perpendicular axes and the inclination being the position of the vector with respect to a third mutually perpendicular axis.

If the key "C" is pressed on the keyboard at the end of the first spin (as shown in FIGS. 5 and 7) when a calibration has been measured, the computer replies with "CAL =" and the operator replies with the known value of the calibrated sample.

I claim:

1. A magnetic orientation estimator comprising support means, magnetic flux sensitive pickup head means carried by said support means and producing an electrical output corresponding to the intensity of a magnetic field to which said pickup head means responds, rotor means carried by said support means for rotating a sample of material near to the head means, analogue to digital converter means electrically connected to the head means for converting the electrical output of the head means into digital form for feeding an input of a computer, revolution detection means positioned with respect to the rotor means for responding to rotation thereof and producing a first output signal when a complete revolution of the sample is achieved, and a series of position detection means positioned with respect to the rotor means for responding to rotation thereof and producing a series of second output signals indicating predetermined angular increments of each revolution of the sample, the first and series of second output signals also feeding inputs of the computer, such that during an interval defined by successive ones of said first output signals, said analogue to digital converter supplies its digital output at the occurrence of each of said series of second output signals, said computer acting upon said digital output of said analogue to digital converter, in conjunction with the position of each of the series of position detection means to estimate the magnetic orientation of the sample.

2. A magnetic orientation estimator as claimed in claim 1 comprising a computer programmed to receive and store in a series of locations in a memory bank digital information and periodically to sum further digital information with the stored information and store the sum in the same locations, subsequently to provide a Fourier analysis of the wave form represented by the digital information summed in the locations and store components characterizing the wave form in a further memory bank, to clear the series of locations in the first mentioned memory bank, to repeat storage and summing in the series of locations and storing of corresponding components characterizing the further wave form resulting from the repetition and to combine the stored components for obtaining resulting components characterized by each of the stored components.

3. A magnetic orientation estimator as claimed in claim 2 in which the analogue digital convertor is adapted to feed successive digital words sequentially to the series of locations in the memory bank of the computer upon occurrence of the series of second output signals.

4. A magnetic orientation estimator as claimed in claim 3 in which the computer is adapted to sum further digital words in the series of locations upon occurrence of the first output signal.

5. A magnetic orientation estimator as claimed in claim 1 in which the rotor is provided with a locator for locating the sample of material in relation to the pick up head, a holder being provided for holding the sample in alternative locations on the locator for repeating the rotation with the sample held in various orientations.

6. A magnetic orientation estimator as claimed in claim 5 in which the holder comprises a cube with a cavity opening from a top face and resilient members extending from each of the four sides of the opening to an adjacent side of the cavity remote from the opening.

7. A magnetic orientation estimator as claimed in claim 6 in which the cavity is bounded by cylindrical faces of a top and, a base and pillars connecting the top and base, apertures being provided in the base for allowing passage of the resilient members, four of which are provided symmetrically around the cavity.

8. A magnetic orientation estimator as claimed in claim 7 in which the position detection means comprises a photoelectric cell and a series of slots spaced around a disc.

9. A magnetic orientation estimator as claimed in claim 8 in which the revolution detection means comprises a further photo electric cell and a single slot, spaced from the series of slots in the disc.

* * * * *